United States Patent
George et al.

(10) Patent No.: US 10,915,516 B2
(45) Date of Patent: Feb. 9, 2021

(54) EFFICIENT TRICKLE UPDATES IN LARGE DATABASES USING PERSISTENT MEMORY

(71) Applicant: Cisco Technology, Inc., San Jose, CA (US)

(72) Inventors: Johnu George, San Jose, CA (US); Amit Kumar Saha, Bangalore (IN); Debojyoti Dutta, Santa Clara, CA (US); Madhu S. Kumar, San Mateo, CA (US); Ralf Rantzau, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 562 days.

(21) Appl. No.: 15/786,829

(22) Filed: Oct. 18, 2017

(65) Prior Publication Data
US 2019/0114337 A1   Apr. 18, 2019

(51) Int. Cl.
*G06F 16/23* (2019.01)
*G06F 16/22* (2019.01)
*G06F 12/1009* (2016.01)
*G06F 16/901* (2019.01)
*G06F 16/2455* (2019.01)
*G06F 12/0868* (2016.01)

(52) U.S. Cl.
CPC ...... *G06F 16/2282* (2019.01); *G06F 12/0868* (2013.01); *G06F 12/1009* (2013.01); *G06F 16/235* (2019.01); *G06F 16/24561* (2019.01); *G06F 16/902* (2019.01); *G06F 2212/1024* (2013.01); *G06F 2212/154* (2013.01); *G06F 2212/163* (2013.01); *G06F 2212/222* (2013.01); *G06F 2212/465* (2013.01)

(58) Field of Classification Search
CPC .................. G06F 16/235; G06F 16/24561
See application file for complete search history.

(56) References Cited

U.S. PATENT DOCUMENTS

| | | | |
|---|---|---|---|
| 6,304,867 B1 * | 10/2001 | Schmidt | G06F 16/284 |
| 6,691,101 B2 | 2/2004 | MacNicol et al. | |
| 7,480,672 B2 | 1/2009 | Hahn et al. | |
| 8,086,755 B2 | 12/2011 | Duffy, IV et al. | |
| 8,713,405 B2 | 4/2014 | Healey, Jr. et al. | |
| 8,990,335 B2 | 3/2015 | Fauser et al. | |
| 9,003,159 B2 | 4/2015 | Deshkar et al. | |
| 9,229,810 B2 | 1/2016 | He et al. | |

(Continued)

OTHER PUBLICATIONS

Astakhov et al., "Lambda Architecture for Batch and RealTime Processing on AWS with Spark Streaming and Spark SQL," Amazon Web Services (AWS), May 2015, pp. 1-12.

*Primary Examiner* — Kris E Mackes
(74) *Attorney, Agent, or Firm* — Polsinelli PC

(57) ABSTRACT

Systems, methods, and computer-readable media for storing data in a data storage system using a child table. In some examples, a trickle update to first data in a parent table is received at a data storage system storing the first data in the parent table. A child table storing second data can be created in persistent memory for the parent table. Subsequently the trickle update can be stored in the child table as part of the second data stored in the child table. The second data including the trickle update stored in the child table can be used to satisfy, at least in part, one or more data queries for the parent table using the child table.

17 Claims, 10 Drawing Sheets

(56) References Cited

U.S. PATENT DOCUMENTS

| | | |
|---|---|---|
| 9,244,761 B2 | 1/2016 | Yekhanin et al. |
| 9,244,776 B2 | 1/2016 | Koza et al. |
| 9,361,192 B2 | 6/2016 | Smith et al. |
| 9,374,270 B2 | 6/2016 | Nakil et al. |
| 9,479,556 B2 | 10/2016 | Voss et al. |
| 9,483,337 B2 | 11/2016 | Gladwin et al. |
| 9,558,078 B2 | 1/2017 | Farlee et al. |
| 9,613,078 B2 | 4/2017 | Vermeulen et al. |
| 2002/0103815 A1 | 8/2002 | Duvillier et al. |
| 2003/0174725 A1 | 9/2003 | Shankar |
| 2005/0080801 A1* | 4/2005 | Kothandaraman ..... H04L 67/06 |
| 2015/0142733 A1 | 5/2015 | Shadmon |
| 2015/0149479 A1* | 5/2015 | Geringer ............ G06F 16/9027 |
| | | 707/743 |
| 2015/0222444 A1 | 8/2015 | Sarkar |
| 2015/0302058 A1 | 10/2015 | Li et al. |
| 2016/0119159 A1 | 4/2016 | Zhao et al. |
| 2016/0335180 A1* | 11/2016 | Teodorescu ............. G06F 8/427 |
| 2016/0335361 A1 | 11/2016 | Teodorescu et al. |
| 2017/0053132 A1 | 2/2017 | Resch |
| 2017/0116663 A1* | 4/2017 | Francis ................ B65G 1/1373 |

\* cited by examiner

EFFICIENT TRICKLE UPDATES IN LARGE DATABASES USING PERSISTENT MEMORY

TECHNICAL FIELD

The present technology pertains to data storage, and in particular to storing trickle updates to data using persistent memory.

BACKGROUND

In traditional databases, data is stored in disk-based tables, e.g. large tables, with indices. The process of storing data in large tables with indices consumes large amounts of time and computational resources. Additionally, the process of retrieving data from large tables using the indices to satisfy queries consumes large amounts of time and computational resources. These problems are further exacerbated when dealing with smaller trickle updates. Storing trickle updates in traditional large database tables is problematic in that storing such small amounts of data still requires large amounts of time and computational resources, in particular with respect to updating indices of the tables in storing the trickle updates. Additionally, answering queries using trickle updates stored in large database tables can increase an amount of time and resources used in answering the queries.

Further, in traditional databases, received data is stored in large tables at set times with large gaps between the set times, e.g. when users are not accessing the databases. As a result, a great amount of time can pass between when a trickle update is received and when the trickle update is actually stored in a large table of a traditional database. As a result, queries are frequently answered with old data as the newest data, in the form of trickle updates, is not available or otherwise has not been written to large tables in the databases.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
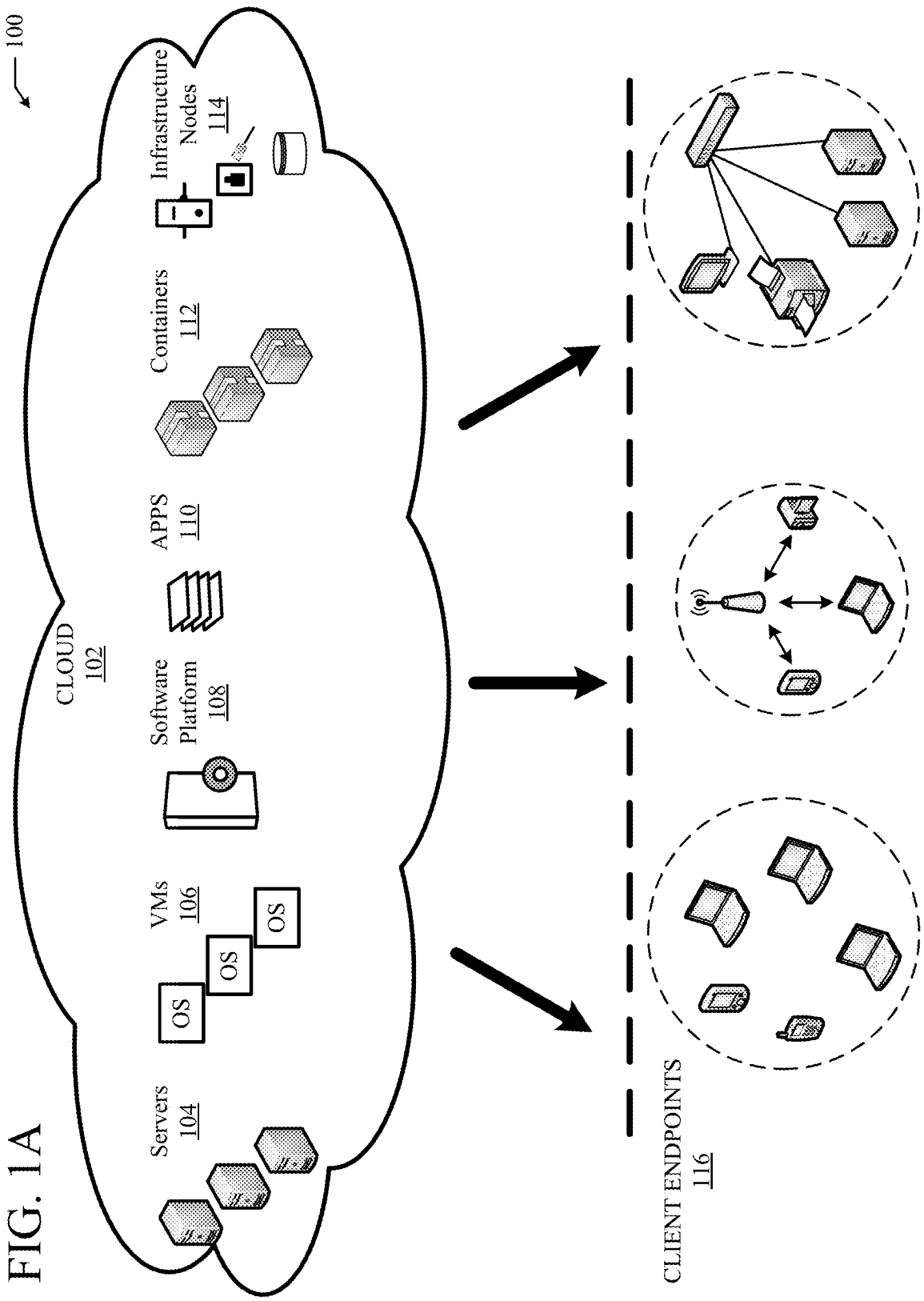
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include receiving, at a data storage system storing first data in a parent table, a trickle update to the first data stored in the parent table. A child table storing second data can be created in persistent memory for the parent table, as part of the data storage system. The trickle update can be stored in the child table as part of the second data stored in the child table. Subsequently, the second data including the trickle update stored in the child table can be utilized to satisfy, at least in part, data queries for the parent table.

A system can receive, at a data storage system storing first data in a parent table, a trickle update to the first data stored in the parent table. The system can create a child table storing second data in persistent memory for the parent table, as part of the data storage system. The trickle update can be stored at a bit level in the child table as part of the second data stored in the child table. Subsequently, the system can utilize the second data including the trickle update stored in the child table to satisfy, at least in part, data queries for the parent table.

A system can receive, at a data storage system storing first data in a parent table, a trickle update to the first data stored in the parent table. The system can create a child table as a hash table storing second data in persistent memory for the parent table, as part of the data storage system. The trickle update can be stored in the child table as part of the second data stored in the child table. Subsequently, the system can utilize the second data including the trickle update stored in the child table to satisfy, at least in part, data queries for the parent table.

DESCRIPTION

The disclosed technology addresses the need in the art for efficiently and quickly storing trickle updates to data in large databases. The present technology involves system, methods, and computer-readable media for storing trickle updates in a child table maintained in persistent memory.

Figure 7:
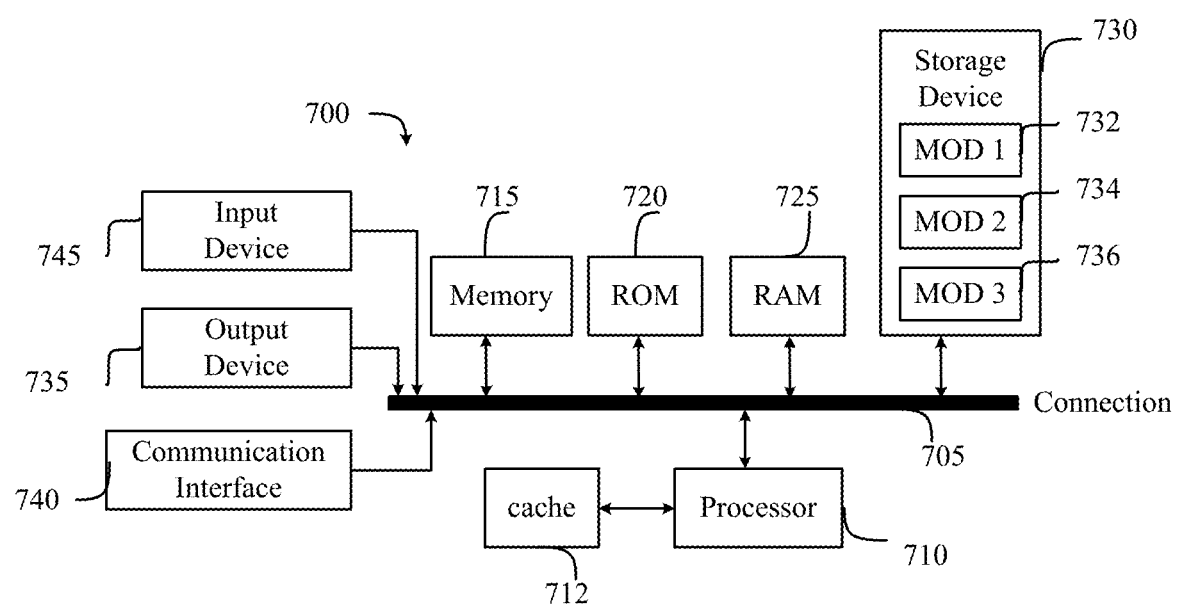
FIG. 7 illustrates an example computing system.
Figure 8:
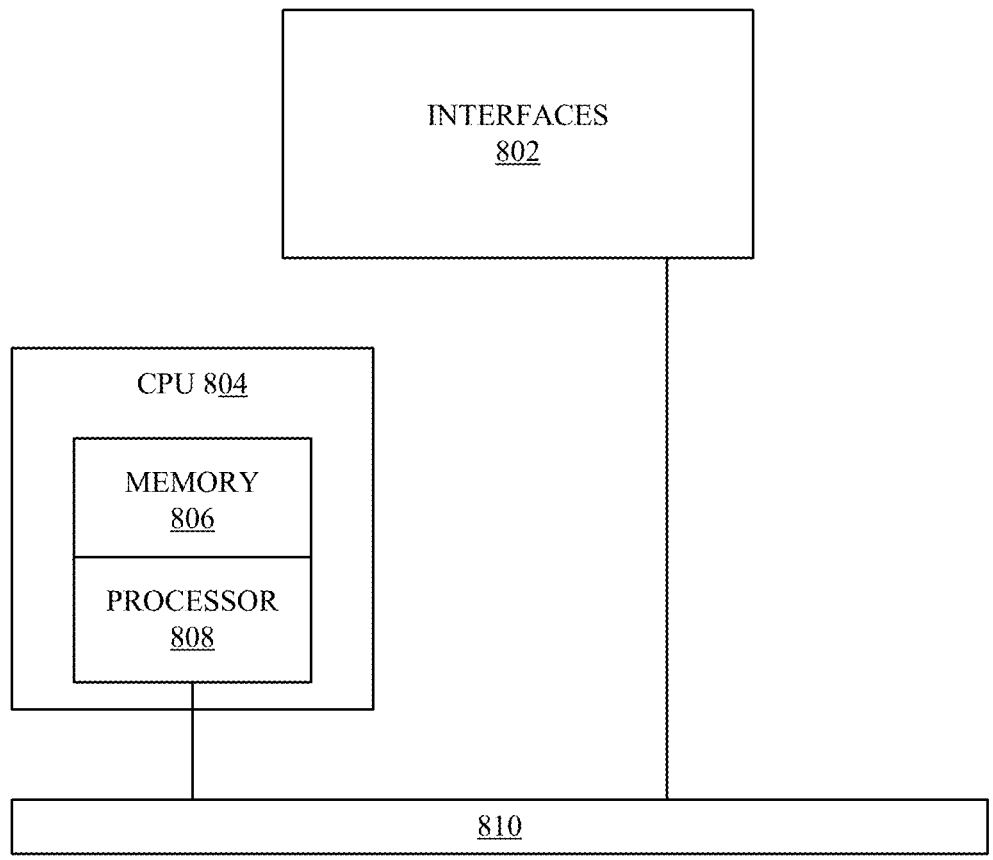
FIG. 8 illustrates an example network device.

A description of network environments and architectures for network data access and services, as illustrated in FIGS. 1A, 1B, 2A, and 2B, is first disclosed herein. A discussion of systems and methods for storing trickle updates to data in large databases, as shown in FIGS. 3, 4, 5, and 6, will then follow. The discussion then concludes with a brief description of example devices, as illustrated in FIGS. 7 and 8. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

Figure 1B:
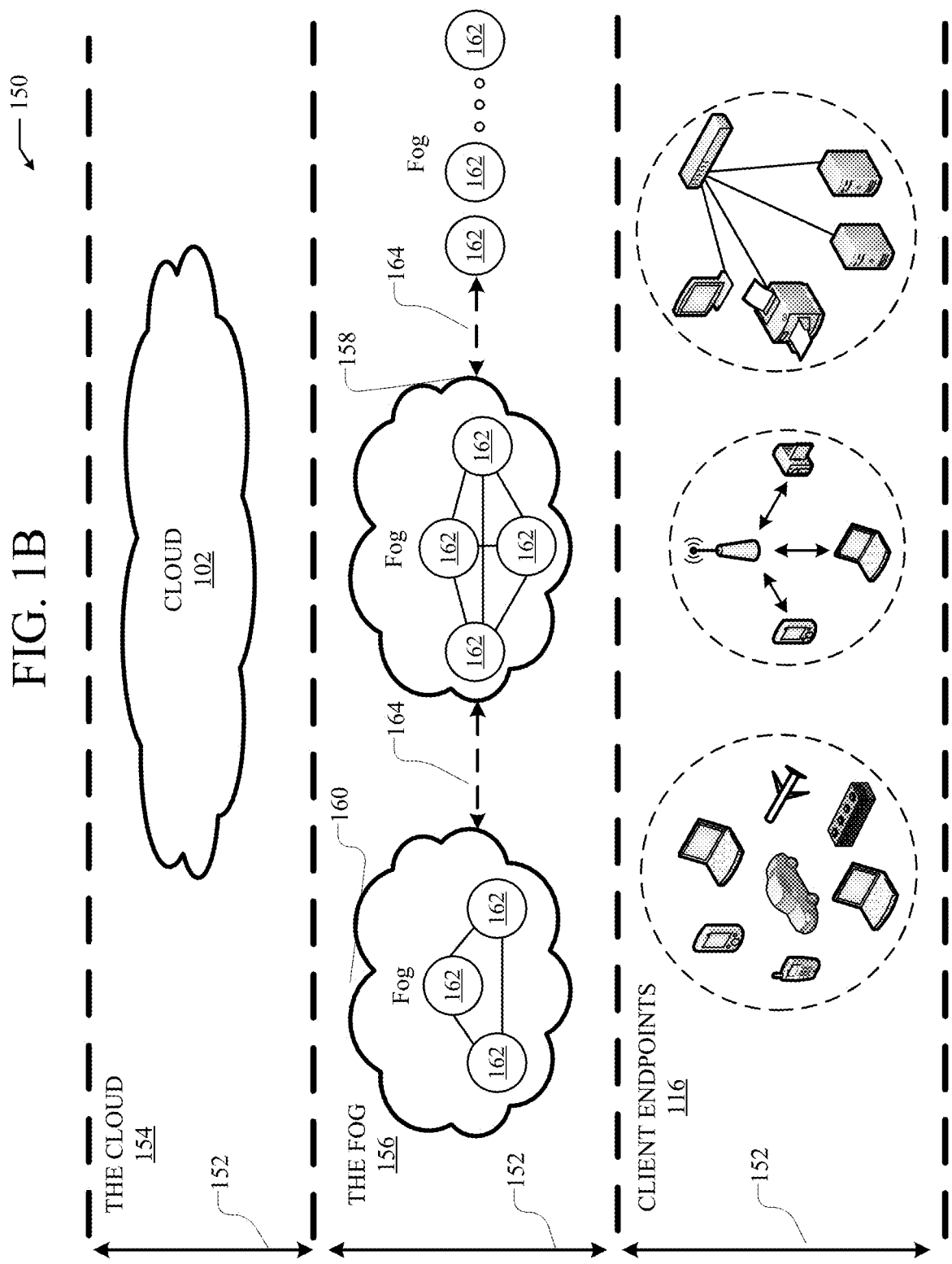
FIG. 1B illustrates an example fog computing architecture.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
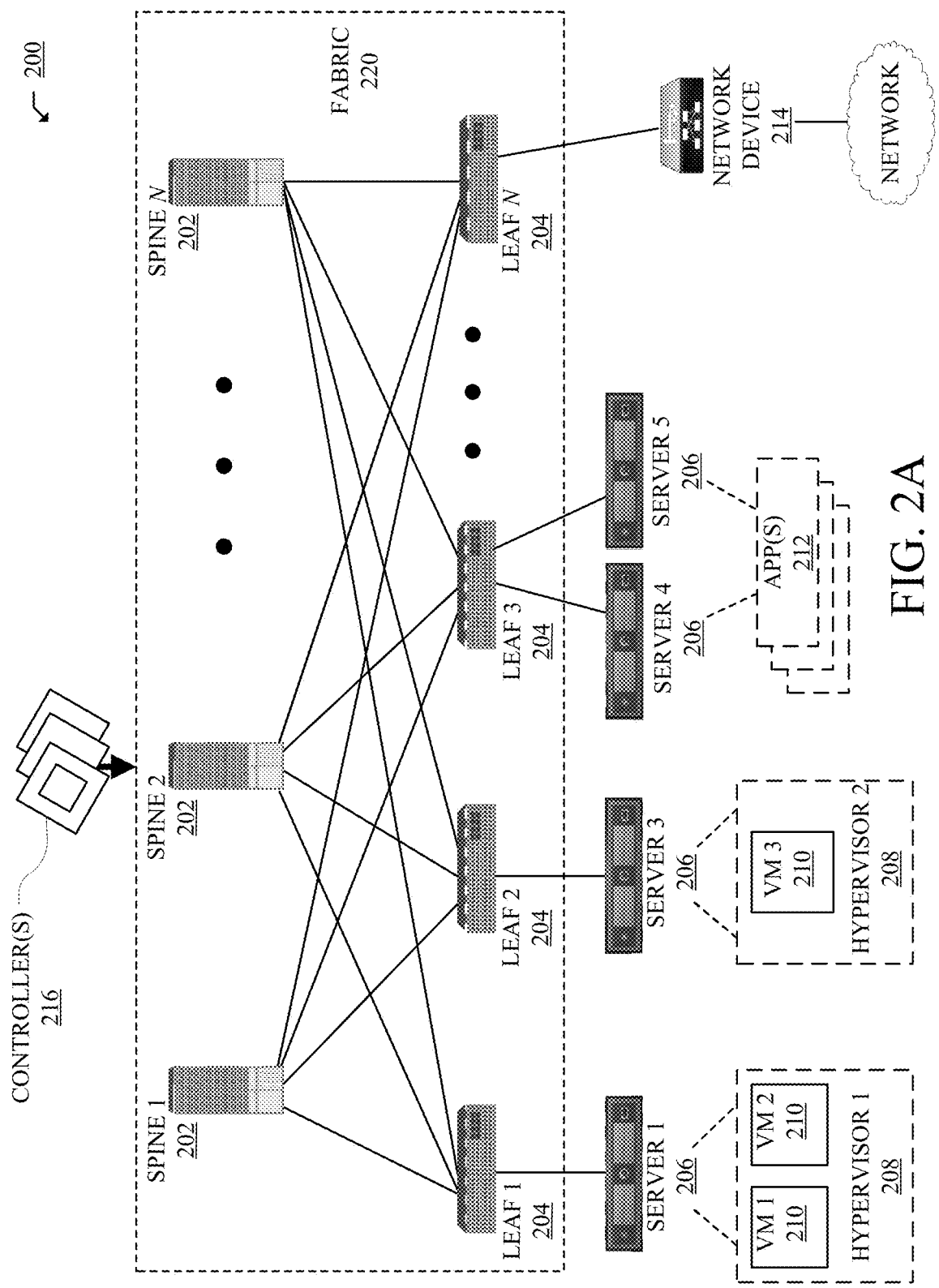
FIG. 2A illustrates a diagram of an example Network Environment.

FIG. 2A illustrates a diagram of an example Network Environment 200, such as a data center. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, Virtual Machines (VMs) 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 and/or Hypervisors 208 can be migrated to other Servers 206. Servers 206 can similarly be migrated to other locations in Network Environment 200. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 200. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a software-defined network (SDN) infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

Figure 2B:
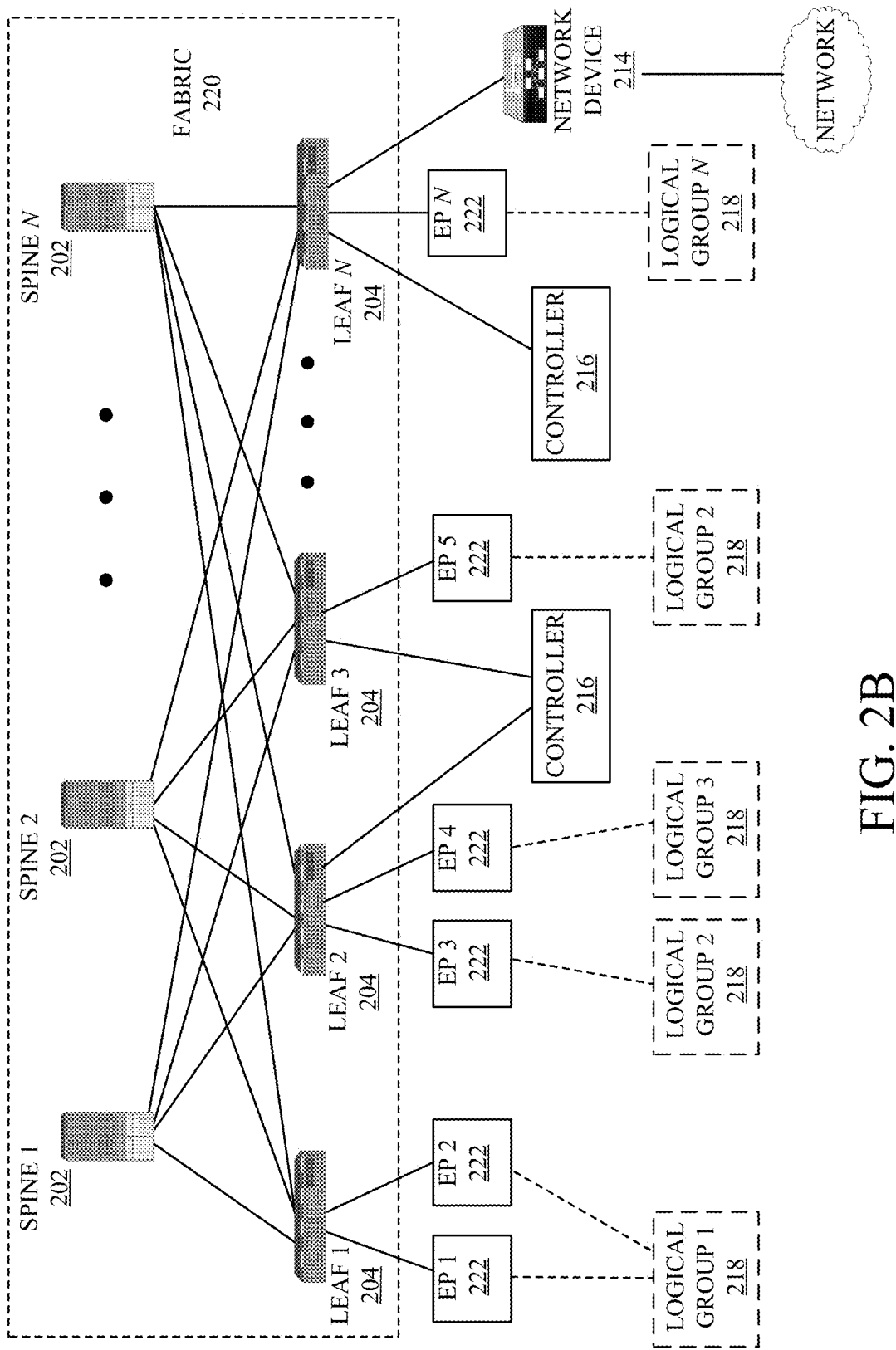
FIG. 2B illustrates another example of a Network Environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

The computing architectures shown in FIGS. 1A and 1B and the network environments shown in FIGS. 2A and 2B can be used to implement, at least in part, a data storage system, e.g. a database. A data storage system, as discussed herein, can be a distributed data storage system. A distributed data storage system can include clusters of nodes, otherwise referred to as distributed storage clusters. A distributed data storage system can be implemented as a distributed database. For example, a distributed data storage system can be implemented as a non-relational database that stores and accesses data as key-value pairs. Additionally, a distributed data storage system can be implemented across peer network data stores. For example, a distributed storage system can include peers acting as nodes within a distributed storage cluster that are connected and form the distributed storage cluster through an applicable network environment, such as the networks shown in FIGS. 2A and 2B.

In traditional databases, data is stored in disk-based tables, e.g. large tables, with indices. The process of storing data in large tables with indices consumes large amounts of time and computational resources. Additionally, the process of retrieving data from large tables using the indices to satisfy queries consumes large amounts of time and computational resources.

In updating traditional databases, trickle updates to large tables are received and written to tables. Trickle updates of data can include updates of small amounts of data that occur on a regular basis. In particular, trickle updates can include data that is orders of magnitude less in size than data stored in a large table. Additionally, trickle updates can be received at small periodic time increments, such as every minute, as opposed to large portions of data that are received in a single instance.

Storing trickle updates in traditional large database tables is problematic in that storing such small amounts of data still requires large amounts of time and computational resources. Additionally, answering queries using trickle updates stored in large database tables can increase an amount of time and resources used in answering the queries.

Further, in traditional databases, received data is stored in large tables at set times with large gaps between the set times, e.g. when users are not accessing the databases. As a result, a great amount of time can pass between when a trickle update is received and when the trickle update is actually stored in a large table of a traditional database. As a result, queries are frequently answered with old data as the newest data, in the form of trickle updates, is not available or otherwise has not been written to the large tables in the database.

In order to more efficiently store trickle updates without the use of large tables and indices, a child table can be created for the larger table in a database. A child table can be created in response to receiving trickle updates for data stored in the larger table in a database. Additionally, a child table can automatically be created for a large table when either or both the large table is created and data is stored in the large table.

A child table can be created in persistent memory and can be used to store trickle updates, potentially as they are received. This reduces an amount of time before the trickle updates are actually stored in the database. Additionally, as the child table is implemented in persistent memory, the trickle updates can be written into the child table faster than they can be written into the large disk-based table, while consuming less computational resources to actually perform the writing. As a result, latency between when the trickle updates are received and actually stored in the database system is reduced while using less computational resources to write the trickle updates into the database system.

Further, in order to more efficiently and accurately answer database queries the child table can be used to satisfy received database queries. In particular, a query can be received, and the child table can be scanned to determine if the child table contains the necessary data for satisfying the query. If the child table can be used to satisfy the query, at least in part, then the data stored in the child table can actually be used to satisfy the query, potentially without having to access the larger disk-based tables of the database. As the child table can be implemented in persistent memory, data in the child table can be accessed faster using less computational resources than data stored in the large disk-based tables. As a result, using the child table to answer the query can lead to faster query response times while using less computational resources to provide the query responses. Additionally, as data stored in the child table might be newer than data stored in the large tables, answering queries using the child table can increase accuracy in answers to queries by reducing the chances that a query is answered with stale data.

Figure 3:
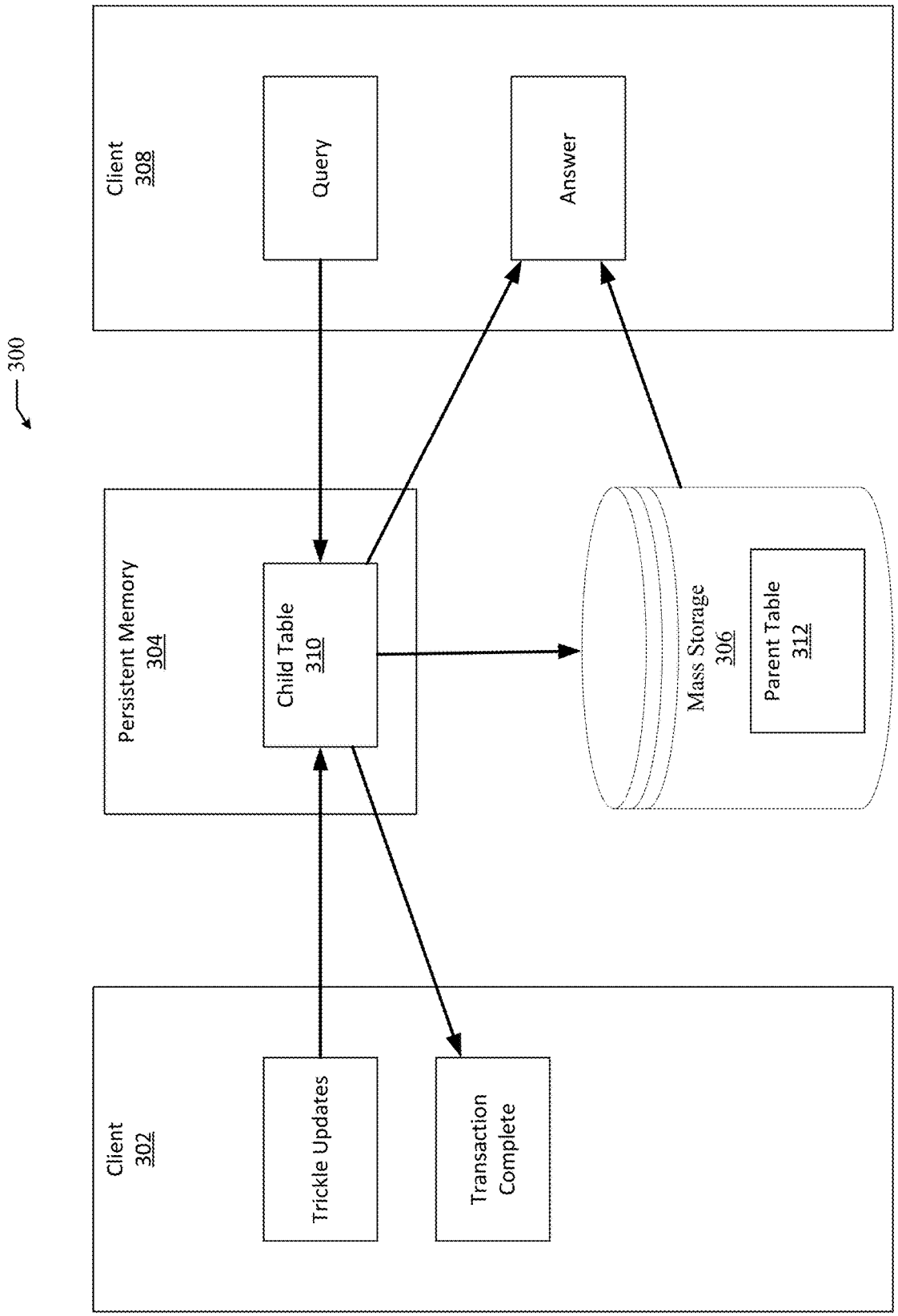
FIG. 3 depicts a diagram of a storage environment for storing trickle updates.

FIG. 3 depicts a diagram of a storage environment 300 for storing trickle updates. The storage environment 300 includes a first client 302, a persistent memory 304, a mass storage 306, and a second client 308. While the first client 302 and the second client 308 are shown as separate clients, in various embodiments, they can be the same client. More specifically, a single client can provide both trickle updates and queries for data. Further, a single client can receive confirmation that a transaction of storing trickle updates is complete and also answers to database queries.

The persistent memory 304 and the mass storage 306 can form, at least part of, an applicable data storage system, such as the data storage systems described in this paper. The persistent memory 304 can be an applicable form of persistent and/or non-volatile memory or be implemented at an applicable persistent and/or non-volatile memory storage devices. Herein, the terms persistent and non-volatile are used interchangeably and can refer to a computer memory storage that maintains or otherwise allows access to data stored therein even after a process that created or last modified the data ends. Additionally persistent and non-volatile memory can include memory capable of withstanding a power reset while still maintaining contents stored therein. For example, persistent and non-volatile memory can include flash memory that maintains stored data even after power to the flash memory is cut-off.

The mass storage 306 includes applicable disk storage for large amounts of data. Specifically, the mass storage 306 can include one or more disk drives that use one or a combination of electronic, magnetic, optical, or mechanical mechanisms for storing data. For example, the mass storage 306 can include a hard disk drive that uses magnetic storage to store data.

The mass storage 306 includes a parent table 312. The parent table 312 can be implemented as an applicable structured format for storing large amounts of data. For example, in either a relational database or a flat file database, the parent table 312 can store data arranged in columns and rows according to relations amongst the data. The parent table 312 can include indices for use in locating and retrieving the data stored in the parent table 312. Indices for the parent table 312 can be updated whenever new data is stored in the parent table 312 or the data is otherwise modified or reorganized within the parent table 312. The process of updating indices consumes large amounts of computational resources. For this reason, large amounts of small updates, or trickle updates are typically accumulated before they are actually written to the parent table 312. This is problematic in that updates are not written as fast as they are received or if they are written as fast they are received, large amounts of computational resources are consumed. In turn, queries satisfied using data stored in the parent table 312 might not include the newest data.

The persistent memory includes a child table 310. The child table 310 can correspond to the parent table 312 and be used to store data that is stored in or otherwise will be stored in the parent table. The child table 310 is implemented in the persistent memory 304. In being implemented in the persistent memory 304, data can be stored in and read from the child table 310 faster than it can be stored in and read from the parent table 312 implemented at the mass storage 306. Additionally, in being implemented in the persistent memory 304, data can be stored in the child table 310 at a bit level and accessed from the child table 310 at the bit level. For example, a client can access a single bit of data stored in the child table 310.

Data can be stored in the child table 310 without indices. As a result, whenever new data is stored in the child table 310 or data in the child table 310 is rearranged, indices do not need to be updated. This reduces an amount of used computational resources and potentially leads to reduced data storage or read failures occurring as a result of updating or re-formulating indices. Additionally, this increases the speed at which data can be written into and subsequently read from the child table 310.

The child table 310 can be implemented as a hash table in the persistent memory 304. In being implemented as a hash table, data can be stored in the child table 310 according to a hash function. More specifically, using a hash function a key can be assigned to buckets that can subsequently store specific data in the child table 310. Based on a hash function used to implement the child table 310 as a hash table, an index can be generated for use in retrieving data stored in the child table 310.

The persistent memory 304 can receive trickle updates from the first client 302. Trickle updates received from the first client 302 can include either or both modifications to data already stored in the parent table 312 in the mass storage 306 or new data to add to the parent table 312 in the mass storage 306. For example, trickle updates can include modifications to a few rows in the parent table 312. Additionally, trickle updates received from the first client 302 can include late arriving data. Late arriving data can include data that arrives at a data storage system a specific time period after it is generated in real-time. For example, late arriving data can include data that includes an incorrect time stamp and/or is generated by a data source that is not connected to a network time protocol associated with a data storage system.

The trickle updates received from the first client 302 at the persistent memory 304 can subsequently be written into the child table 310. The received trickle updates can be written into the child table 310 immediately upon receipt at the persistent memory 304. Alternatively, the received trickle updates can be written into the child table 310 after a specific amount of time has passed after the trickle updates are received at the persistent memory 304. For example, the received trickle updates can be written into the child table at a configurable periodicity, e.g. every five seconds.

A transaction acknowledgment can be sent to the first client 302 based on receipt of the trickle updates. A transaction acknowledgment sent to the first client 302 can specify either or both that the trickle updates were received at a data storage system and that the trickle updates were stored in the persistent memory 304. Additionally, a transaction acknowledgement can be sent to the first client 302 either after the trickle updates are received at a data storage system or after the trickle updates are stored in the persistent memory 304.

Trickle updates stored in the child table 310 can subsequently be written to the parent table 312 in mass storage 306. As the child table 310 is maintained in the persistent memory 304 as opposed to being implemented in volatile memory, trickle updates are not unexpectedly lost or removed from memory, thereby ensuring, at least in part, that the trickle updates can eventually be written to the parent table 312 in the mass storage 306. The trickle updates can be written from the child table 310 to the parent table 312 according to either or both a configurable amount of time or after a threshold amount of data, potentially user-specified, has been reached in the child table 310. For example, the trickle updates can be written to the parent table 312 from the child table 310 every twelve hours. In another example, the trickle updates can be written from the child table 310 to the parent table 312 after an amount of data in the child table exceeds 8 Gb.

The second client 308 can provide a request or a query for data stored in the data storage system including the persistent memory 304 and the mass storage 306. The data storage system can subsequently access the child table 310 to see if the query can be answered from data included in the child table 310. The data storage system can access the child table 310 to see if a data query can be answered, at least in part, from the child table while refraining from accessing the parent table 312. This is advantageous, as accessing the parent table 312 is slower and utilizes more computational resources than accessing the child table 310. As a result, data queries can be answered faster using the child table 310. Additionally, as the child table 310 can store newer data before it is transferred to the parent table 312, in using the child table 310 to solely answer a query can facilitate answering the query using new data as opposed to stale data.

If the entire data query can be answered using the data stored in the child table 310, then an answer to the query can be provided back to the second client 308 using the data in the child table 310. Alternatively, if the data query is unanswerable using solely the child table 310, then the data storage system can access the parent table 312 to provide an answer to all or portions of the query unable to be answered using the child table 310. As a result, the data storage system can provide an answer to the query back to the second client 308 solely from the parent table or from a combination of the child table and the parent table 312. As the child table 310 can store newer data before it is transferred to the parent table 312, in using the child table 310 in combination with the parent table 312 to answer a query can facilitate answering the query using new data as opposed to stale data.

Figure 4:
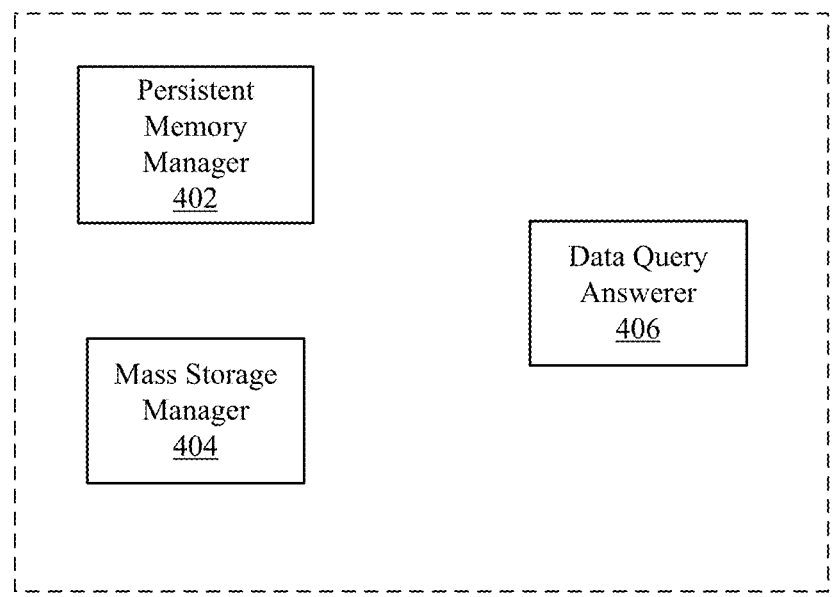
FIG. 4 depicts a diagram of an example multi-table update data storage system.

FIG. 4 depicts a diagram of an example multi-table update data storage system 400. The example multi-table update data storage system 400 shown in FIG. 4 can be configured to manage storage of data in a data storage system including persistent memory implementing a child table and mass storage implemented a parent table, such as the data storage system shown in FIG. 3. The multi-table update data storage system 400 can be implemented, at least in part, in a cloud system or a fog system, such as the systems shown in the example architectures shown in FIGS. 1A and 1B.

The multi-table update data storage system 400 shown in FIG. 4 includes a persistent memory manager 402, a mass storage manager 404, and a data query answerer 406. The persistent memory manager 402 can manage persistent memory in the multi-table update data storage system 400. In managing persistent memory in the multi-table update data storage system 400, the persistent memory manager 402 can manage an applicable child table, such as the child table 310 implemented in the persistent memory 304. As part of managing persistent memory in the multi-table update data storage system 400, the persistent memory manager 402 can add received trickle updates to a child table. For example, the persistent memory manager 402 can use a hash function to add trickle updates to a child table implemented as a hash table.

The persistent memory manager 402 can flush data from a child table managed by the persistent memory manager 402. More specifically, the persistent memory manager 402 can remove trickle updates stored in a child table implemented in persistent memory managed by the persistent memory manager 402. The persistent memory manager 402 can flush data from a child table based on transfer of the data to a parent table in mass storage. For example, once trickle updates are written from a child table to a parent table in mass storage, the persistent memory manager 402 can flush the trickle updates from the child table. Additionally, the persistent memory manager 402 can flush data from a child table based on an amount of data in the child table. For example, if a child table contains an amount of data beyond a user-specified threshold amount, e.g. an entry limit, then the persistent memory manager 402 can flush trickle updates from the child table.

Further, the persistent memory manager 402 can flush data from a child table managed by the persistent memory manager 402 based on time associated with the data. Specifically, the persistent memory manager 402 can flush data from a child table based on a user-configurable periodicity. For example, the persistent memory manager 402 can flush data from a child table every twenty four hours. Additionally, the persistent memory manager 402 can flush data from a child table according to a time based order of the data. For example, the persistent memory manager 402 can flush older trickle updates from a child table according to a length of time that the trickle updates have been in the child table.

The mass storage manager 404 can manage mass storage in the multi-table update data storage system 400. In managing mass storage in the multi-table update data storage system 400, the mass storage manager 404 can manage an applicable parent table, such as the parent table 312 implemented in the mass storage 306. For example, the mass storage manager 404 can flush data from a parent table implemented in mass storage, as part of managing the mass storage.

In managing mass storage, the mass storage manager 404 can write data to a parent table implemented in the mass storage. More specifically, the mass storage manager 404 can write trickle updates stored in a child table into a parent table corresponding to the child table. In writing trickle updates stored in a child table into a parent table, the mass storage manager 404 can determine whether to actually write the trickle updates into the parent table, and subsequently write the trickle updates into the parent table if it is determined to write the updates to mass storage. For example, the mass storage manager 404 can determine to write late arriving sensor data stored in a child table into a parent table, after which the sensor data can be written into the parent table and potentially be used to answer data queries for the parent table.

In writing data to a parent table implemented in mass storage, the mass storage manager 404 can update indices for the parent table. More specifically, the mass storage manager 404 can update indices for a parent table as trickle updates are written to the parent table from a child table. Indices updated by the mass storage manager 404 can subsequently be used to answer data queries using a parent table.

The mass storage manager 404 can determine whether to write data into a parent table based on an amount of data stored in a child table corresponding to the parent table. For example, the mass storage manager 404 can determine to write trickle updates into a parent table from a child table if an amount of data in the child table exceeds 8 GB. A specific amount of data stored in the child table that is used to determine whether to write data from the child table into a corresponding parent table can be a user-configurable or defined amount. For example, a user can define an entry limit for a child table, and the mass storage manager 404 can subsequently write data from the child table into a parent table when the entry limit is reached in the child table.

Further, the mass storage manager 404 can determine whether to write data stored in a child table into a parent table based on a time associated with the data stored in the child table. For example, the mass storage manager 404 can determine to write trickle updates into a parent table after a specific amount of time has passed since the trickle updates were written into a child table. A specific amount of time that data has been stored in a child table, as is used for determining whether to write the data to a parent table, can be a user-configurable or defined amount. For example, a user can specify that trickle updates written to a child table should be written to a parent table every twelve hours, and the mass storage manager 404 can subsequently write the trickle updates from the child table to the parent table every twelve hours.

The mass storage manager 404 can use a background thread to write data from a child table into a parent table. In using a background thread to write data from a child table into a parent table, data can be read from either or both the child table and the parent table, potentially to answer data queries. Additionally, in using a background thread to write data from a child table into a parent table, other data, potentially from another source, can still be written into either or both the child table and the parent table as the data is written from the child table to the parent table. For example, in using a background thread to write data from a child table into a parent table, trickle updates can simultaneously be written into the child table as the data is written from the child table into the parent table.

The data query answerer 406 can answer data queries. More specifically, the data query answerer 406 can answer data queries using either or both an applicable child table, such as the child table 310 implemented in the persistent memory 304, and an applicable parent table, such as the parent table 312 implemented in the mass storage 306. For example, the data query answerer 406 can use a child table to answer a query for trickle updates stored in the child table. In another example, the data query answerer 406 can use a child table and a parent table to provide data stored in the parent table and trickle updates to the data that are stored in the child table and have not been transferred to the parent table. In using a child table implemented in persistent memory to answer data queries, the queries can be answered more quickly while using less computation resources than traditional data storage systems. Additionally, using a child table implemented in persistent memory to answer data queries can ensure that a data query is answered with the newest available data, e.g. data that is still not stored in a parent table.

The data query answerer 406 can attempt to first answer a data query using a child table, e.g. as part of determining whether the child table can be used to answer the data query. More specifically, the data query answerer 406 can attempt to answer a data query from a child table while refraining from trying to answer the query from a corresponding parent table. Subsequently, if the data query answerer is unable to answer a data query in its entirety from a child table, then the data query answerer 406 can use a corresponding parent table to answer the query, either in its entirety or in part.

Figure 5:
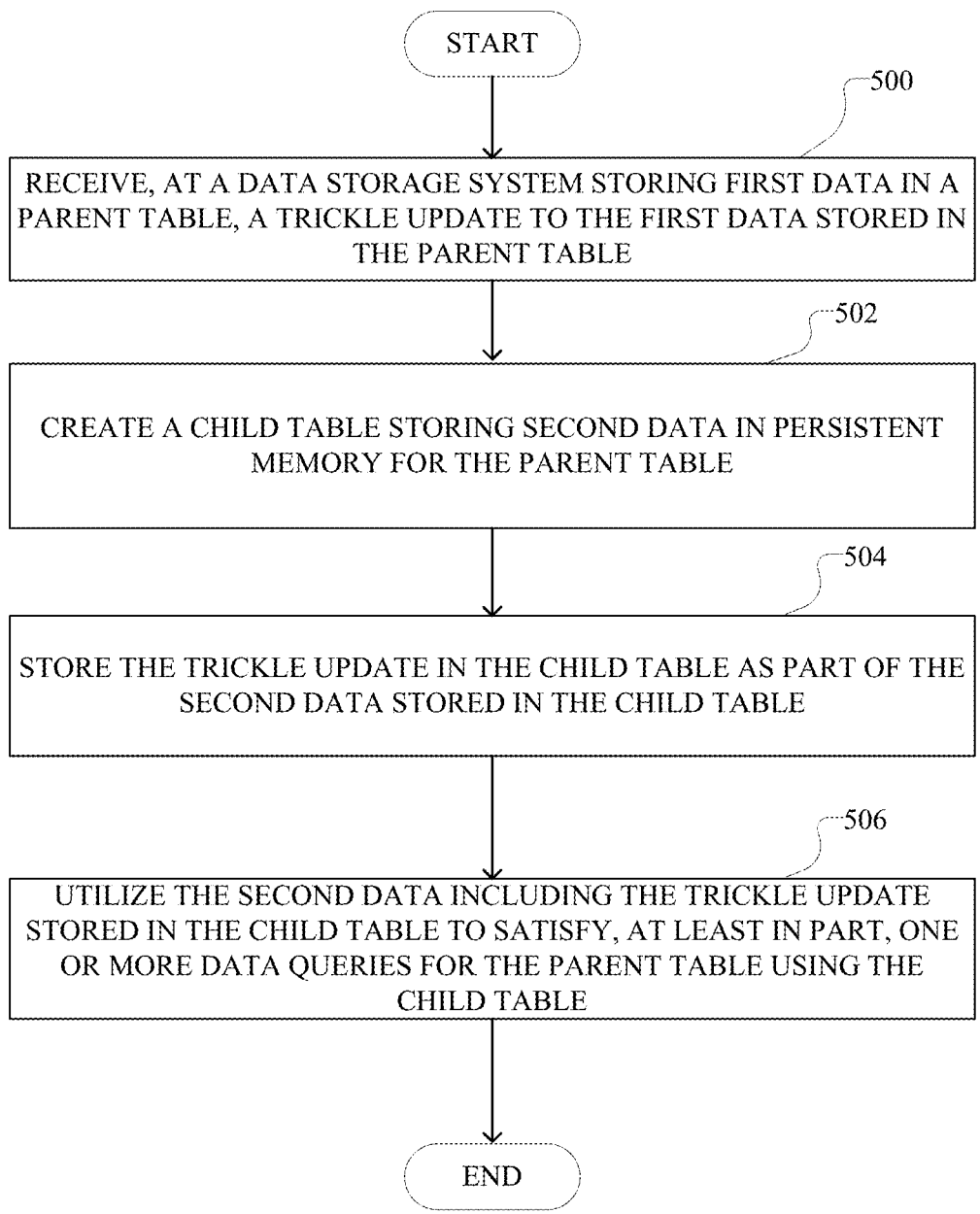
FIG. 5 illustrates a flowchart for an example method of utilizing multiple tables to answer data queries for trickle updates.

FIG. 5 illustrates a flowchart for an example method of utilizing multiple tables to answer data queries for trickle updates. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated.

Each module shown in FIG. 5 represents one or more steps, processes, methods or routines in the method. For the sake of clarity and explanation purposes, the modules in FIG. 5 are described with reference to the storage environment 300 shown in FIG. 3 and the multi-table update data storage system 400 shown in FIG. 4.

At step 500, a data storage system storing first data in a parent table can receive a trickle update to the first data stored in the parent table. The persistent memory manager 402 can receive a trickle update to first data stored in the parent table. A received trickle update can include late arriving data, e.g. improperly time stamped data. Additionally, a trickle update can be received as part of transferring of smaller amounts of data at a relatively slow frequency.

At step 502, the persistent memory manager 402 creates a child table storing second data for the parent table in persistent memory. By being implemented in persistent memory, a child table can be written to and read from more quickly than the parent table, e.g. the parent table implemented in mass storage. Additionally, by implementing the child table in persistent memory, data can be written to and read from the table at a bit level. A child table can be a hash table that is created using a hash function. Additionally, a child table for the parent table can be created without indices. This allows for quicker reads and writes to the child table while consuming less computational resources.

At step 504, the persistent memory manager 402, stores the trickle update in the child table as part of the second data stored in the child table. The trickle update can be stored in the child table immediately as the trickle update is received. Alternatively, the trickle update can be stored in the child table after a specific number of trickle updates are received. In various embodiments, a portion of the second data stored in the child table can be flushed in response to storing the trickle update in the child table or otherwise to make room for the trickle update in the child table.

At step 506, the data query answerer 406 uses the second data including the trickle update stored in the child table to satisfy, at least in part, one or more data queries for the parent table using the child table. In satisfying one or more queries for the parent table using the child table implemented in the persistent memory, the queries can be answered more quickly while using less computational resources as opposed to answering the queries purely from mass storage, e.g. the parent table implemented in mass storage. In various embodiments, one or more queries can be answered using both the first data in the parent table and the second data including the trickle update in the child table in combination with each other. Answering, at least in part, one or more queries using the second data stored in the child table helps to ensure the queries are answered with the newest data, e.g. data that might not be stored as the first data in the parent table.

Figure 6:
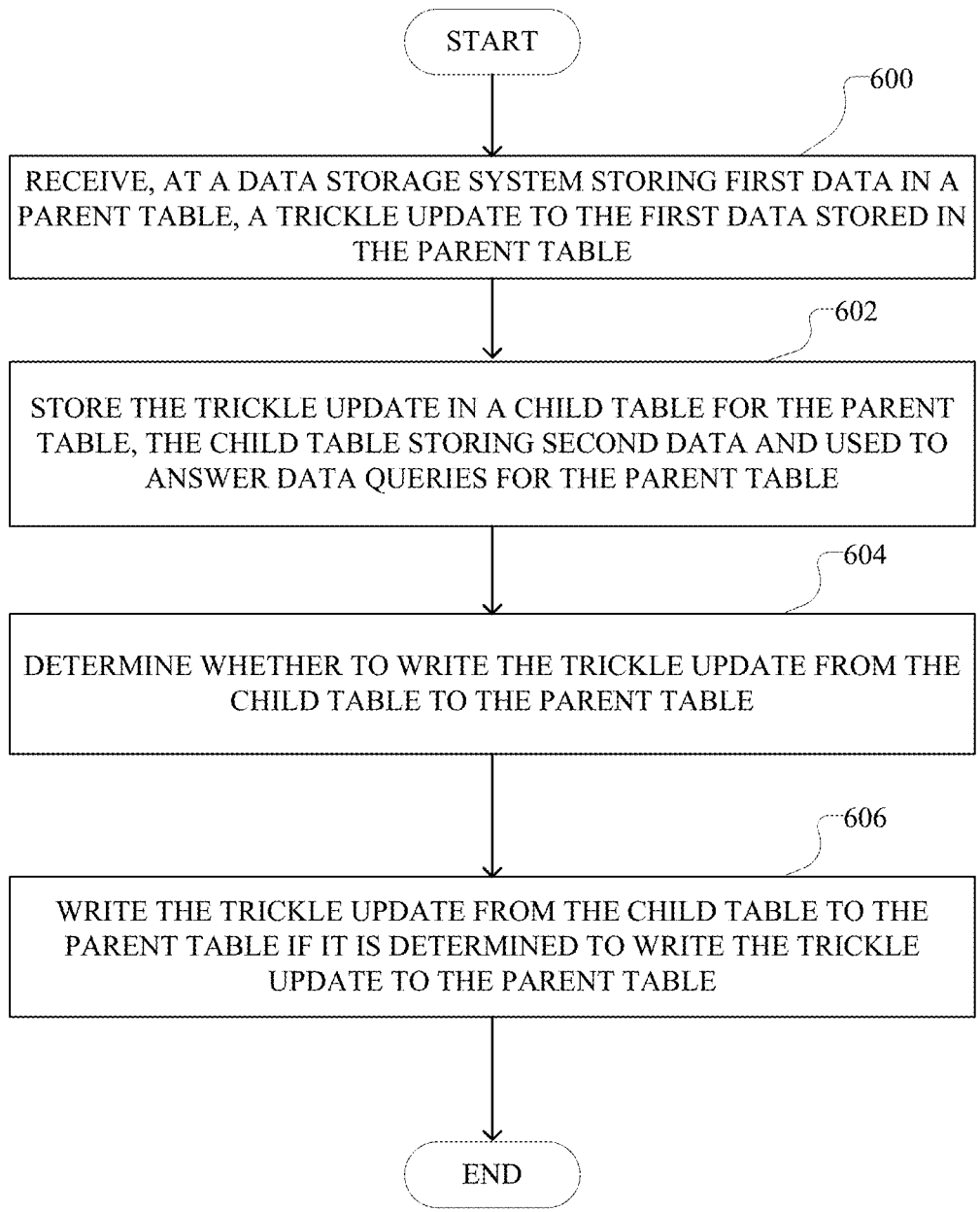
FIG. 6 illustrates a flowchart for an example method of writing data between multiple tables to answer data queries for trickle updates.

FIG. 6 illustrates a flowchart for an example method of writing data between multiple tables to answer data queries for trickle updates. The method shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated.

Each module shown in FIG. 6 represents one or more steps, processes, methods or routines in the method. For the sake of clarity and explanation purposes, the modules in FIG. 6 are described with reference to the storage environment 300 shown in FIG. 3 and the multi-table update data storage system 400 shown in FIG. 4.

At step 600, a data storage system storing first data in a parent table can receive a trickle update to the first data stored in the parent table. The persistent memory manager 402 can receive a trickle update to first data stored in the parent table. A received trickle update can include late arriving data, e.g. data from a sensor that was offline.

At step 602, the persistent memory manager 402, stores the trickle update in a child table for the parent table as part of second data stored in the child table. The trickle update can be stored in a child table implemented in persistent memory. The trickle update can be stored in a child table without using or otherwise updating indices. Additionally, the trickle update can be stored in a child table created as a hash table using a hash function. A child table into which the trickle update is stored can be used to answer data queries for the parent table.

At step 604, the mass storage manager 404 determines whether to write the trickle update from the child table into the parent table. The mass storage manager 404 can determine whether to write the trickle update from the child table into the parent table based on an amount of the second data stored in the child table. For example, if an amount of data of the second data stored in the child table exceeds a defined threshold amount of data, then the mass storage manager 404 can determine to write the trickle update from the child table to the parent table. Additionally, the mass storage manager 404 can determine whether to write the trickle update from the child table into the parent table based on a configurable periodicity or configurable amount of time. For example, if a user specifies writing trickle updates into a parent table two hours after the trickle updates are written into a child table, and two hours have passed since the trickle update was written into the child table, then the mass storage manager 404 can determine to write the trickle update into the parent table.

At step 606, the mass storage manager 404 writes the trickle update from the child table into the parent table if it is determined to write the trickle update to the parent table. The trickle update can be written from the child table into the parent table using a background thread. This can allow for data to be read from either or both the parent table and the child table as the trickle update is written to the parent table from the child table. Additionally, this can allow for other data to be written into either or both the parent table and the child table as the trickle updates are written to the parent table from the child table.

The disclosure now turns to FIGS. 7 and 8, which illustrate example network devices and computing devices, such as switches, routers, load balancers, client devices, and so forth.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

FIG. 8 illustrates an example network device 800 suitable for performing switching, routing, load balancing, and other networking operations. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards").

Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A computer-implemented method comprising:
   receiving, at a data storage system storing first data in a parent table, a trickle update to the first data stored in the parent table;
   creating a child table in persistent memory for the parent table, the child table storing second data;
   storing the trickle update in the child table as part of the second data stored in the child table according to a configurable periodicity for storing data in the child table absent one or more indices;
   utilizing the second data including the trickle update stored in the child table to satisfy, at least in part, one or more data queries for the parent table using the child table;
   writinq at least a portion of the second data including the trickle update stored in the child table to the parent table;

indexing the at least the portion of the second data including the trickle update for use in accessinq the at least a portion of the second data including the trickle update from the parent table;

flushing the at least the portion of the second data including the trickle update written from the child table in response to writinq the at least a portion of the second data including the trickle update in the parent table; and wherein the at least the portion of the second data including the trickle update is written into the parent table using a background thread to allow answering of data queries from the second data stored in the child table while the at least the portion of the second data including the trickle update is written into the parent table and until the at least the portion of the second data including the trickle update is flushed from the child table.

2. The method of claim 1, further comprising:
receiving a data query for the parent table;
scanning the child table to determine whether the data query can be satisfied by the child table using the second data including the trickle update stored in the child table; and
providing at least a portion of the second data stored in the child table from the child table to satisfy the data query, if it is determined that the data query can be satisfied by the child table.

3. The method of claim 1, further comprising:
receiving a data query for the parent table;
scanning the child table to determine whether the data query can be satisfied by the child table using the second data including the trickle update stored in the child table; and
providing at least a portion of the first data stored in the parent table to satisfy the data query, if it is determined that the data query is unable to be satisfied by the child table.

4. The method of claim 1, wherein the second data is stored in the child table in the persistent memory without indices.

5. The method of claim 1, further comprising:
determining whether to write the at least the portion of the second data including the trickle update from the child table into the parent table; and
writing the at least the portion of the second data including the trickle update to the parent table if it is determined to write the at least the portion of the second data including the trickle update from the child table into the parent table.

6. The method of claim 5, wherein it is determined whether to write the at least the portion of the second data including the trickle update from the child table into the parent table based on an amount of second data stored in the child table.

7. The method of claim 5, wherein it is determined whether to write the at least the portion of the second data including the trickle update from the child table into the parent table based on a user-configurable threshold amount of second data stored in the child table.

8. The method of claim 5, wherein it is determined whether to write the at least the portion of the second data including the trickle update from the child table into the parent table based on a configurable amount of time.

9. The method of claim 8, wherein the configurable amount of time includes an amount of time that the at least the portion of the second data including the trickle update has been written in the child table.

10. The method of claim 1, wherein the trickle update includes late arriving data.

11. The method of claim 1, wherein the trickle update is stored at a bit level in the child table and the first data including the trickle update is accessible from the child table at the bit level.

12. The method of claim 1, wherein the child table is implemented as a hash table in the persistent memory.

13. A system comprising:
one or more processors; and
at least one computer-readable storage medium having stored therein instructions which, when executed by the one or more processors, cause the one or more processors to perform operations comprising:
receiving, at a data storage system storing first data in a parent table, a trickle update to the first data stored in the parent table;
creating a child table in persistent memory for the parent table, the child table storing second data;
storing the trickle update at a bit level in the child table as part of the second data stored in the child table according to a configurable periodicity for storing data in the child table absent one or more indices;
utilizing the second data including the trickle update stored in the child table to satisfy, at least in part, one or more data queries for the parent table using the child table;
writing at least a portion of the second data including the trickle update stored in the child table to the parent table;
indexing the at least the portion of the second data including the trickle update for use in accessing the at least a portion of the second data including the trickle update from the parent table;
flushing the at least the portion of the second data including the trickle update written from the child table in response to writing the at least a portion of the second data including the trickle update in the parent table; and
wherein the at least the portion of the second data including the trickle update is written into the parent table using a background thread to allow answering of data queries from the second data stored in the child table while the at least the portion of the second data including the trickle update is written into the parent table and until the at least the portion of the second data including the trickle update is flushed from the child table.

14. The system of claim 13, wherein the instructions which, when executed by the one or more processors, further cause the one or more processors to perform operations comprising:
receiving a data query for the parent table;
scanning the child table to determine whether the data query can be satisfied by the child table using the second data including the trickle update stored in the child table; and
providing at least a portion of the second data stored in the child table from the child table to satisfy the data query, if it is determined that the data query can be satisfied by the child table.

15. The system of claim 13, wherein it is determined whether to write the at least the portion of the second data including the trickle update from the child table into the parent table based on an amount of second data stored in the child table.

16. The system of claim 13, wherein it is determined whether to write the at least the portion of the second data including the trickle update from the child table into the parent table based on a configurable amount of time.

17. A non-transitory computer-readable storage medium having stored therein instructions which, when executed by a processor, cause the processor to perform operations comprising:
receiving, at a data storage system storing first data in a parent table, a trickle update to the first data stored in the parent table;
creating a child table as a hash table in persistent memory for the parent table, the child table storing second data;
storing the trickle update in the child table as part of the second data stored in the child table according to a configurable periodicity for storing data in the child table absent one or more indices;
utilizing the second data including the trickle update stored in the child table to satisfy, at least in part, one or more data queries for the parent table using the child table;
writing at least a portion of the second data including the trickle update stored in the child table to the parent table;
indexing the at least the portion of the second data including the trickle update for use in accessing the at least a portion of the second data including the trickle update from the parent table;
flushing the at least the portion of the second data including the trickle update written from the child table in response to writing the at least a portion of the second data including the trickle update in the parent table; and
wherein the at least the portion of the second data including the trickle update is written into the parent table using a background thread to allow answering of data queries from the second data stored in the child table while the at least the portion of the second data including the trickle update is written into the parent table and until the at least the portion of the second data including the trickle update is flushed from the child table.

* * * * *